United States Patent

[11] 3,565,134

| [72] | Inventor | Ira C. Toms<br>1246 Biltmore Drive, Fort Myers, Fla. 33901 |
|---|---|---|
| [21] | Appl. No. | 793,655 |
| [22] | Filed | Jan. 24, 1969 |
| [45] | Patented | Feb. 23, 1971 |

[54] HOLDER AND GUIDE FOR POWER TOOL
6 Claims, 6 Drawing Figs.

[52] U.S. Cl. .................................................. 143/6, 143/47
[51] Int. Cl. .................................................. B27g 5/02
[50] Field of Search .......................................... 143/6.43, 6.1, 6, 47.6; 83/(Inquired)

[56] References Cited
UNITED STATES PATENTS

| 1,522,604 | 1/1925 | Torlinski ..................... | 143/6 |
| 2,502,640 | 4/1950 | Coleman ..................... | 143/6 |
| 2,802,493 | 8/1957 | Horneland................... | 143/6 |
| 2,987,083 | 6/1961 | Ross et al..................... | 143/6 |

*Primary Examiner*—Donald R. Schran
*Attorneys*—Clarence A. O'Brien and Harvey B. Jacobson

ABSTRACT: A tool carriage is slidingly mounted to a rail assembly which in turn is connected to an offset radial arm. The radial arm is secured to a pivotal standard permitting the rotation of the offset radial arm about the standard axis. Adjustable clamping means are provided on the tool carriage to secure a power tool thereon.

PATENTED FEB 23 1971

Ira C. Toms
INVENTOR.

BY Clarence A. O'Brien
and Harvey B. Jacobson
Attorneys

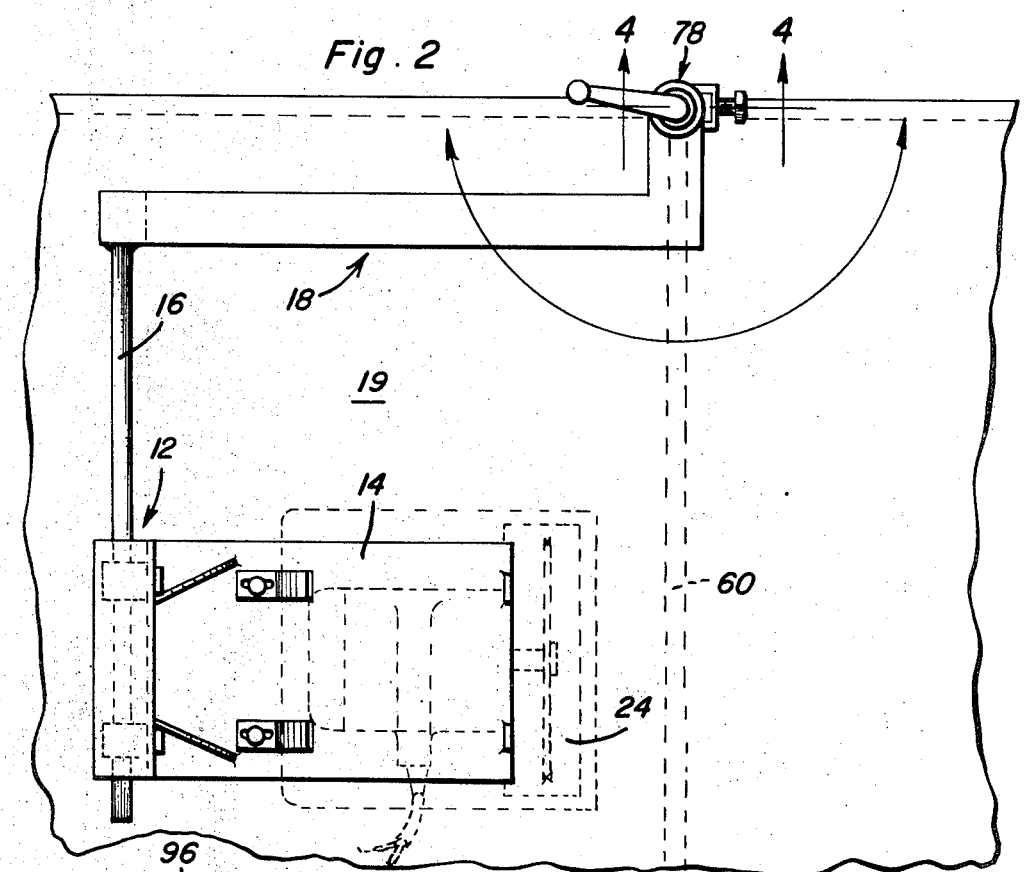
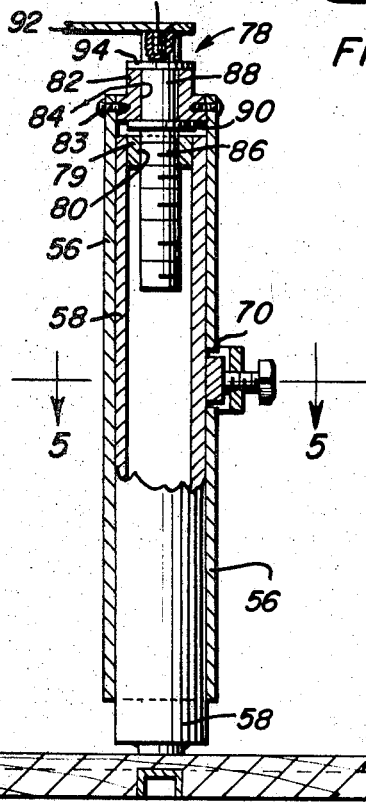
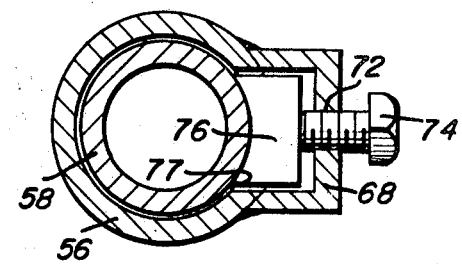
Ira C. Toms
INVENTOR.

HOLDER AND GUIDE FOR POWER TOOL

The present invention relates to power tool holders and guides and more particularly to a tool carriage mounted upon a rotatable radial arm.

The prior art includes a wide variety of radial-arm mounts for securing a power tool to an angularly displaceable holder or guide. One such type includes the conventional radial-arm saw consisting of a radially extending rail slidingly mounting an electrically driven saw blade. Straight cuts and mitre cuts can be made by varying the angular position of the radial arm as well as the pivoting the motor housing and connected saw blade with respect to the saw bar. Although this type of saw has gained wide acceptance in workshops, it is unpractical for use in the field where the tool must be frequently moved thereby necessitating a light and compact unit, unlike a radial-arm saw. A previously conceived modification to the fixed radial-arm saw includes a carriage mounted to a radial arm or rail, the carriage being adapted to mount a portable builder's saw or power saw. Although this type of arrangement permits the utilization of conventional portable saws in the field for achieving accurate cuts, the projection of the radial arm into a space where a worker's head is normally disposed during a machining operation, requires unnecessary time delay due to the caution that the worker must exercise when using the tool. Further, this projection of the radial arm prevents the tool user from closely inspecting the cut of the saw as it cuts a workpiece. Certain of the latter mentioned prior art devices include holddown screws for clamping the base of a power saw to the tool carriage. However, after extended use of the tool, the holddown screws may be loosened thereby presenting a dangerous situation to the workman who is unaware of the condition.

It will be noted that the present invention is adaptable to many forms of power tools. However, for purposes of convenience, the preferred embodiment of the present invention is directed toward a holder and guide for a builder's power saw.

All electric builder's saws or circular saws have two things in common. They have a flat bottom plate or base including a slot therein for permitting passage of a saw blade therethrough. By using a thin supporting plate, to support the saw base from underneath, the invention becomes adaptable to all conventional saw models. The present invention includes an offset radial arm constructed to pivot through an arc of 180° thereby enabling an operator to make a right- or left-hand mitre cut or cuts of any intermediate angle. Compound cuts are facilitated by means for supporting the saw by its base thereby allowing utilization of all the adjustments built into the saw. A sliding carriage having the aforementioned saw supporting plate attached thereto is easily accessible without the encumberance of a large projecting arm or rail included in prior art devices. The present invention further includes clamping means for securing a tool to the carriage with a degree of security greater than that disclosed by prior art devices.

An additional object of the present invention resides in the simplicity of manufacture thus making it readily available to the average homeowner and handyman, without a large investment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a top plan view of the setup shown in FIG. 1.

FIG. 4 is a longitudinal sectional view taken along a plane passing through section line 4—4 illustrating the interior components of a pivoting standard having a height adjustment incorporated therein.

FIG. 5 is a transverse sectional view taken along a plane passing through section line 5—5 of FIG. 4 showing a motion arresting device for the pivoting standard illustrated in FIG. 4.

Figure 1:
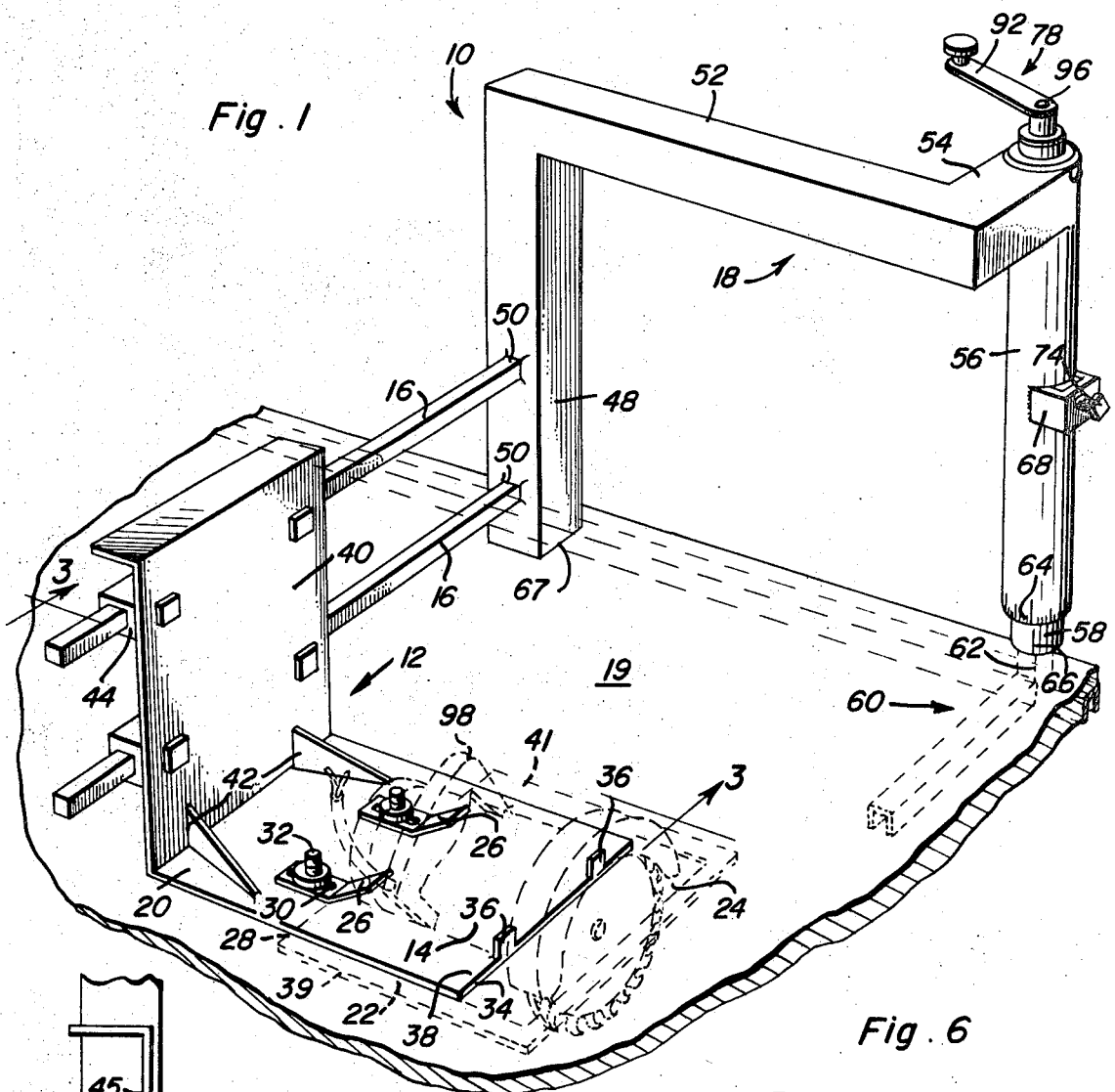
FIG. 1 is a perspective view of the present invention illustrating the disposition of a power saw (in phantom) mounted thereon.

Referring specifically to the drawings and more particularly FIG. 1 thereof, the present tool holder and guide is generally denoted by reference numeral 10 which basically includes a sliding tool carriage 12 which mounts a portable tool such as a portable builder's saw 14, shown in phantom. The carriage is mounted to parallel spaced and vertically aligned carriage rails 16 having vertically aligned ends cantilevered from a vertical section of an offset pivotal radial arm or mount 18. The tool carriage and pivotal mount are adapted to overlie a tabletop indicated by 19 upon which a workpiece is normally supported.

Figure 6:
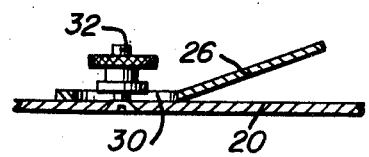
FIG. 6 is a detail sectional view showing a clamp assembly for retaining a portable saw base plate to the tool carriage.

Considering the tool carriage 12 in detail, FIG. 1 illustrates a thin supporting plate 20 for holding or carrying a portable tool, more particularly a builder's power saw 14. Inasmuch as most conventional saw blades of this type include a base plate 22, the carriage is adapted for universal mounting. Further, most conventional saws have an elongated slot 24 therein through which the circular saw blade passes. This slot permits securement between the base plate of the tool and the supporting plate of the carriage as hereinafter explained. A first transverse end 28 is supported by an angle bracket 26 including a first angularly inclined portion bearing against edge 28 and a second portion which is suitably connected to the support plate 20 by means of an adjustable lock assembly comprising an elongated slot 30 in the second bracket portion through which a threaded clamping fastener 32 passes. Thus, the position of the angle bracket along the supporting plate 20 may be varied to accommodate the base plate of saws having varying dimensions. It will be noted that the saw base plate end 28 is both laterally and vertically secured in place by two spaced adjustable angle brackets 26. The particular dimensional relationships between the components of the holddown assembly 26 is clearly shown in FIG. 6.

As seen in FIG. 1, the holddown assemblies 26 prevent lateral motion of the saw base plate in the direction of the assemblies. However, it is necessary to prevent lateral motion in an opposite direction. Toward these ends, upturned flange elements 36 project vertically from an oppositely disposed transverse edge 34 of the supporting plate 20. These flange elements are adapted to engage the inward edge 38 of the aforementioned saw blade slot 24. Thus, the saw base plate is secured at opposite transverse edges thereof to prevent lateral motion in the direction between saw plate edges 28 and 38.

It will be noted from FIG. 1 that no securement means are provided along the longitudinal base edges 39 and 41 of the saw. Securement of this type has not been provided because manual force is applied directly to the saw and inasmuch as the tool carriage is elevated above the workpiece, the only force to be overcome by the tool carriage is the relatively low frictional force between the tool carriage 12 and the carriage rails 16. However, if particular applications require securement of saw base plate edges 39 and 41 to the tool carriage 12, such can be provided by holddown screws or clamp means as would be obvious to one skilled in the art.

Figure 3:
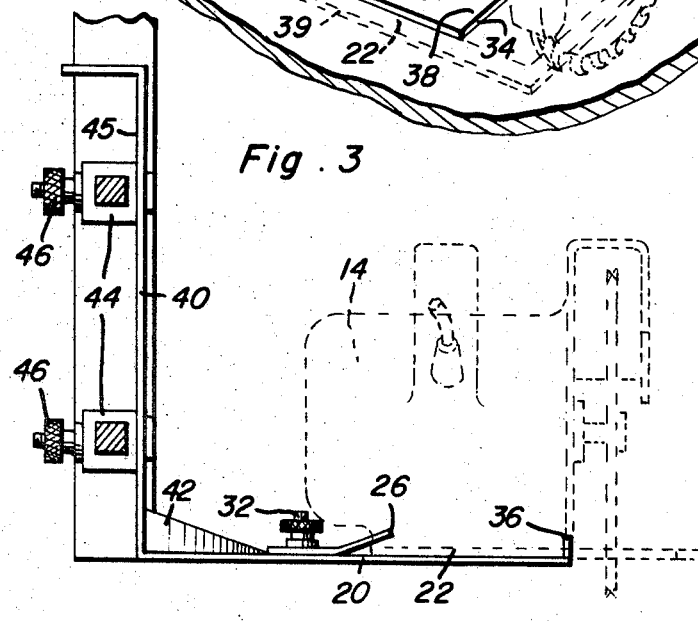
FIG. 3 is a longitudinal sectional view taken along a plane passing through section line 3—3 in FIG. 1.

Referring to FIGS. 1 and 3, there will be shown a vertical plate 40 secured to a transverse edge of supporting plate 20, the latter edge being oppositely disposed from the supporting plate edge 34. Connecting plate members 42 are suitably welded to plates 40 and 20 for insuring the right-angle relation of the plate members of the tool carriage.

A first pair of journal blocks 44 are suitably connected in horizontally aligned spaced relation along the rearward surface 45 of plate 40, FIG. 3. Likewise, a second pair of horizontally aligned journal blocks are suitably mounted to plate 40, each of the latter-mentioned journal blocks being vertically aligned with the aforementioned pair. Conventional holddown screw assemblies 46 provided with knurled tightening knobs permit the securement of carriage 12 at any point along the carrying rails 16. In normal operation of the device these holddown assemblies are loosened to permit relatively effortless traversal of a workpiece by the saw. Instead of using journal blocks, conventional rollers may be used.

The carriage rails 16 are cantilevered from vertically aligned ends 50 as illustrated in FIG. 1. These ends are suitably connected to a vertical section 48 of the offset pivotal mount 18 by suitable means such as welding or the like. The upper end of the vertical section 48 appends to an integrally connected horizontal section 52 which extends in a direction toward the saw blade, and parallel to the longitudinal edges of the supporting plate 20. A third section of the pivotal mount 18 is indicated by 54. The latter section extends in a horizontal direction at right angles to section 52 and in a direction oppositely parallel to carriage rails 16. A final section of the offset pivotal mount 18 includes a hollow cylindrical standard 56 extending vertically downwardly from the free end of the previously mentioned section 54.

It is contemplated that the offset pivotal mount be fabricated from hollow channel sections thereby decreasing the weight of the mount so as to permit relatively effortless manipulation thereof.

Referring to FIGS. 1 and 4, there is shown a stationary vertically oriented shaft 58 which concentrically engages vertical standard 56 upon which the vertical standard 56 is rotatably mounted. The bottom portion of the shaft 58 is mounted to a frame 60 through a vertical connecting section 62. The tabletop 19 is normally supported by the upper surface of the frame 60 and sufficient clearance between the bottom end of shaft 58 and the upper surface of the tabletop must be provided by the connecting section 62. Angular gradation marks 64 may be embossed or otherwise suitably imprinted along the lower circumferential edge of the standard 56. A reference line 66 is similarly imprinted upon the lower portion of shaft 58 which permits the angular setting of the offset pivotal mount in a preselected position. In operation of the device, the lower edge 67 of offset pivotal mount section 48 and the lower surface of the tool carriage 12 must be elevated above the workpiece surface to permit free rotational motion of the pivotal mount 18 thereover. Referring to FIG. 2, it will be noticed that the pivotal mount can be rotated through 180° thus allowing the cutting of a workpiece at mitre angles as well as intermediate angles. It is of particular significance to note that the tool carriage 12 of the present invention permits normal utilization of power saw 14 so that the angle of the saw blade may be varied with respect to the horizontally secured base plate thereof. Thus, by rotating pivotal mount 18 to a preselected angle and by setting the angle of the saw blade at an incline, in a conventional manner, a compound angle may be formed in the workpiece.

Referring to FIGS. 1 and 5, a clamping device for securing the pivotal mount in a preselected angular position is provided and is seen to include a generally U-shaped bracket 68 suitably connected to the exterior surface of the vertical standard 56 by means of welding or the like. A slot 70 is formed in the standard 56, this slot being horizontally aligned with the bight portion of the bracket 68. The bight section further includes an aperture 72 therein for receiving a threaded fastener 74. The fastener includes an outwardly exposed head 74 for permitting threaded displacement of the fastener. The inward end of the fastener bears against a pressure pad 76 having an arcuate edge 77 which contacts the exterior surface of the hollow shaft 58. In operation of the pivotal or rotational motion arresting assembly, the head of the bolt fastener 74 is unscrewed to permit free rotational movement of standard 56 to a preselected angular position. After so obtained, the bolt is tightened which causes a commensurate advance of pressure pad 76 into frictional engagement with the shaft 58 thereby effecting locking engagement between shaft 58 and the standard 56.

Referring to FIGS. 1 and 4, a height adjustment mechanism for varying the elevation of the tool carriage 12 above a workpiece is generally indicated by reference numeral 78. As seen in FIG. 4, a plug member 79 is suitably welded to the top end portion of hollow shaft 58. The plug includes a central threaded bore 80 having a vertical axis colinear with the axis of shaft 58. A collar 82 includes a bore 84 formed centrally therein with an axis coaxially spaced from the axis of the shaft 58. The collar is secured to the interior surface of standard 56 by means of suitable threaded fasteners 83. An elongated threaded member 86 is axially received within the bores of collar 82 and plug 79, one end of the threaded member extending into the interior of hollow shaft 58. As will be noted, the fastener includes an upper portion 88 which is cylindrical. Thus, this portion of the fastener member 86 is slidingly engaged by collar 82.

In operation of the height adjusting mechanism, when the crank handle 92 is turned, motion is transmitted through the handle to the threaded fastener member 86 because the two engage one another by means of a suitable fastener 96. When the handle is rotated in a preselected sense, the fastener member 86 is displaced vertically which causes commensurate upward vertical displacement of a washer or shoulder member 90 fixedly attached to the threaded member 86 along a length immediately beneath the lower surface of collar 82. As the threaded member 86 travels upwardly, the washer 90 bears against the lower collar surface thereby displacing the same upwardly. Inasmuch as the collar is connected to standard 56, upward motion is imparted to the latter. As seen in FIG. 1, section 54 of the offset pivotal mount 18 is integrally connected to the vertical standard 56 so that the resultant upward vertical motion of the standard causes commensurate motion of the pivotal mount. Referring to FIG. 4, it will be seen that a second washer 94 is suitably attached to the outward end portion of threaded member 86 and contacts the upper surface of collar 82. Thus, when the handle 92 is turned in a sense opposite from that previously discussed, the resultant downward travel of threaded member 86 causes downward displacement of washer 94 which in turn bears against the upper surface of collar 82 causing the latter to also travel downwardly. This motion is translated to the vertical standard 56 as hereinbefore explained. Of course, as will be appreciated inasmuch as a solid linkage between tool carriage 12 and the offset pivotal mount 18 exists, the vertical movement of standard 56 results in a similar movement of the tool carriage. Thus, elevation of the saw blade can be adjusted for varying depths of cut as well as for different material thicknesses.

In operation of the device, a workpiece (not shown) is disposed below the tool carriage 12. The height adjustment mechanism 78 is adjusted so that a proper depth of cut may be realized. Next, bolt fastener 74 is unloosened so that the offset pivotal mount 18 can be adjusted for a preselected cutting angle. After tightening of the bolt fastener 74, the invention is in a state of readiness. The handle 98 on saw 14 provides a means of manipulating the tool carriage 12 along the carriage rails 16 so that a completed cut is achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A radial arm mounting for a tool having a base plate and a work engaging means adjacent one edge thereof, the mounting comprising a tool carriage adapted to support the tool thereon, a rail assembly movably mounting the carriage thereon for permitting traversal of the tool across a workpiece, an offset radial arm connected to the rail assembly, support means for the arm allowing pivotal rotation of the arm and rail assembly about an axis of rotation with the rail assembly being maintained in spaced relation to the axis, said carriage including attaching means adapted to supportingly engage the base plate of the tool in spaced relation to the work engaging means thereon, said attaching means extending perpendicularly from one side of the rail assembly in a cantilever fashion.

2. The mounting set forth in claim 1 together with means for varying the vertical position of the radial arm to permit engagement of a tool with workpieces of different thicknesses.

3. The mounting set forth in claim 2 together with means for locking the radial arm in a preselected angular position thereby permitting the machining of a workpiece along any preselected angle.

4. The structure as defined in claim 1 wherein said rail assembly includes a pair of parallel vertically spaced and vertically aligned horizontal rails, said carriage including a vertical plate extending alongside of both of said rails, sleeve means on one surface of the vertical plate slidingly engaging said rails, said attaching means on the carriage including a horizontally disposed plate rigidly connected to the lower end of the vertical plate and extending laterally therefrom in substantially perpendicular relation with the horizontal plate being disposed below the lowermost rail and extending from the vertical plate in a direction opposite to the means on the vertical plate slidingly engaged with the rails.

5. The structure as defined in claim 4 wherein said attaching means includes upwardly extending lugs on the end of the horizontal plate remote from the vertical plate for engaging a base plate of the tool so that the work engaging means on the tool will be disposed outwardly of the end of the horizontal plate to enable observation thereof.

6. The structure as defined in claim 3 wherein said support means includes a stationary post and a sleeve rotatably journaled on said post, said means for locking the radial arm in angular position including a screw-operated brake means interconnecting the post and sleeve for locking the sleeve and post in angularly adjusted position.